(No Model.)

B. THOENS & W. HENDERSON.
STEAM TRAP.

No. 453,523. Patented June 2, 1891.

Witnesses:
Robt. Everett,
J. H. Daly.

Inventors:
Burchard Thoens
William Henderson
By James L. Norris
Atty.

UNITED STATES PATENT OFFICE.

BURCHARD THOENS AND WILLIAM HENDERSON, OF NEW ORLEANS, LOUISIANA.

STEAM-TRAP.

SPECIFICATION forming part of Letters Patent No. 453,523, dated June 2, 1891.

Application filed January 2, 1891. Serial No. 376,557. (No model.)

*To all whom it may concern:*

Be it known that we, BURCHARD THOENS, a subject of the Emperor of Germany, and WILLIAM HENDERSON, a citizen of the United States, both residing at New Orleans, in the parish of Orleans and State of Louisiana, have invented new and useful Improvements in Steam-Traps, of which the following is a specification.

It is the purpose of our invention to provide simple automatic mechanism whereby the water of condensation from steam apparatus of any kind may be trapped and carried off.

It is a further purpose of our invention to provide a steam-trap wherein the release-valve shall be raised by lifting a partly or entirely immersed weight by the gravity of a counterbalancing-weight connected with one another by a system of levers, the entire apparatus being inclosed within the trap-chamber, whereby all danger of leakage from imperfect construction as well as the necessity of packing-openings in the wall of said chamber are entirely avoided.

To these ends our invention consists in the several novel features of construction and new combinations of parts hereinafter fully set forth, and then particularly pointed out and defined in the claims following this specification.

To enable others skilled in the art to make, construct, and use our said invention, we will proceed to describe the same in detail, reference being had to the accompanying drawings, in which—

Figure 1:
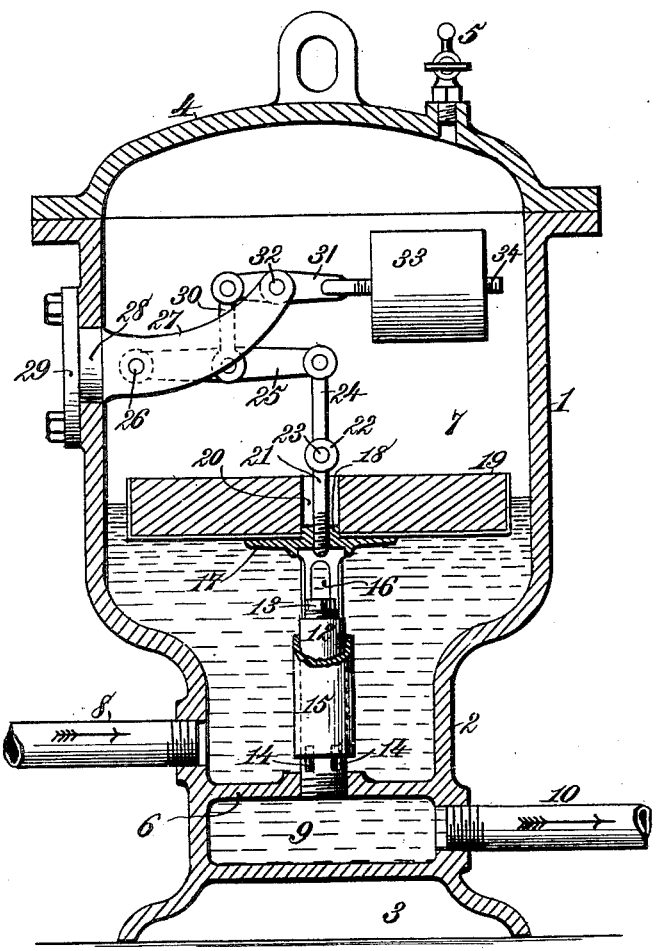
Figure 2:
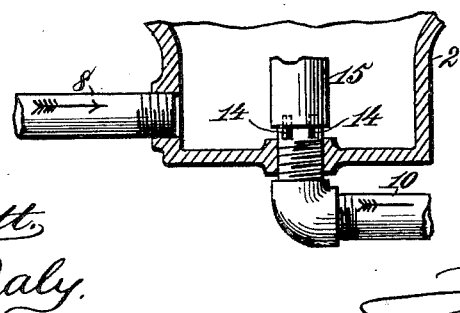

Figure 1 represents a central vertical section taken through the trap, the counterbalance and sleeve-valve being shown in elevation, and a portion of the latter being broken away to show the standing escape-pipe. Fig. 2 is a sectional view showing a modified construction.

In the drawings, the reference-numeral 1 designates the trap, which may be made of any preferred form, the simplest shape and that preferred being a cylindrical upright vessel having a contracted neck 2 at the lower portion and a flaring base 3 for support. The trap-chamber is closed by a cap or cover 4, packed and attached in any ordinary manner and provided with an air or petcock 5.

The lower contracted portion or neck of the trap-chamber is divided by a diaphragm 6 into two parts, one being the entire chamber 7 above said diaphragm for the reception of the water of condensation which enters through a pipe 8, having its end tapped through the wall of the trap a little above the diaphragm 6, while the other and much smaller chamber 9 lies below the diaphragm and between it and the bottom of the trap. The exit-pipe 10 communicates with this chamber, being tapped through the side or cylindrical wall thereof.

Through the diaphragm 6 at or about its center is inserted the open end of a standing pipe 12, having its upper end, which rises to a suitable height in the trap-chamber, closed by a screw or other plug 13. Immediately above the upper surface of the diaphragm 6 openings or slots 14 are formed in the standing pipe 12 at suitable intervals, the number and length or area of these slots being controlled in a measure by the rapidity of condensation and the volume of water to be carried off periodically by the trap.

Closely surrounding the standing escape-pipe 12, but moving freely thereon, is a sleeve-valve 15, provided at its upper end with vertical elongated openings 16. Upon the upper extremity of this sleeve above the openings 16 is formed a plate 17 of circular or other form and provided with a central nipple 18, rising from its upper surface, the plate 17 being fastened in any suitable manner to the float.

The reference-numeral 19 denotes a float or weight formed of any suitable material and provided with a central opening 20, into the lower end of which the nipple or boss 18 enters to make connection with a bar 21, the end of which is tapped into said nipple or boss, while its upper end is provided with an eye 22 to receive a pivot-pin forming part of a link 24, the upper end of which is pivotally connected to a lever 25 of the third order, having its fulcrum 26 supported between the parallel arms of a bracket 27, which forms part of a circular plug 28, lying in the opening in the wall of the trap formed to admit the insertion of the bracket. This plug is an integral part of an outer plate 29 of greater diameter than said opening, said plate being bolted to the exterior of the wall with suitable gaskets, thereby giving a strong and firm support to the bracket and preventing leakage.

Pivotally connected to the lever 25 between the fulcrum and the weight is a link 30, the other end of said link being similarly connected to the end of a lever 31 of the first order, having its fulcrum 32 upon the ends of the arms of the bracket 27. To the power end of said lever is attached a counterbalancing-weight 33, having adjustment toward and from the fulcrum-point 32 upon a threaded bar 34, forming part of the lever 31. This weight is by preference so adjusted that it will counterbalance the weight of the float 19 when the latter is half-submerged, as shown in the drawings. When the trap-chamber is empty, the float 19 and sleeve-valve 15 will descend, the latter covering the slots in the standing pipe 12. If water now flows into the trap until the float is submerged to one-half its thickness, it will rise with the aid of the counter-balance, causing the sleeve-valve to uncover the slots 14, through which the water will escape, passing out through the exit-pipe 10. By adjusting the weight 33 the level at which the water will lift the float and sleeve-valve may be varied with great accuracy.

We may omit the chamber 9 entirely and connect the exit-pipe 10 directly to the trap-chamber, as shown in Fig. 2.

What we claim is—

1. In a steam-trap, the combination, with an inlet-pipe entering a chamber for condensed water, of an outlet-pipe, a standing escape-pipe having an upper closed and a lower open end communicating with the outlet-pipe and provided with slots, a sleeve-valve surrounding and moving upon the standing pipe, a float or weight mounted on the upper end of the sleeve-valve, a counterbalancing-weight having a pivoted lever, and a system of pivotally-connected levers interposed between and connecting the sleeve-valve and the weight-carrying lever, substantially as described.

2. In a steam-trap, the combination, with an inlet-pipe entering a chamber for condensed water, of an outlet-pipe communicating with a smaller chamber beneath and separated from the first by a diaphragm, a standing escape-pipe having its open end passing through said diaphragm and provided with vertical slots above the latter, a sleeve-valve surrounding the escape-pipe and having its upper end rising above the closed end of the standing pipe and connected to a float, a bracket supported by the wall of the chamber, a pivoted lever carrying a weight, and a system of pivotally-connected levers interposed between and connecting the sleeve-valve and the weight-carrying lever, substantially as described.

3. In a steam-trap, the combination, with inlet and outlet pipes communicating with separate chambers, of an escape-pipe passing through the separating-wall and having slots above the same, a sleeve-valve adapted to rise and fall on the escape-pipe, a float and a counter-balance connected to the sleeve-valve, the latter having openings in its upper end, and a system of levers of the first and third orders fulcrumed on a bracket and connecting the float and counter-balance, the whole being arranged within the trap-chamber substantially as described.

In testimony whereof we have hereunto set our hands in presence of two subscribing witnesses.

BURCHARD THOENS.
WILLIAM HENDERSON.

Witnesses:
E. J. BARNETT,
A. S. VINET.